United States Patent Office 3,382,210
Patented May 7, 1968

3,382,210
LACTONE MODIFIED EPOXIDE RESINS
John W. Wyart, Short Hills, Joseph A. Vona, Westfield, and Albert Schrage, East Orange, N.J., assignors to Celanese Corporation, a corporation of Delaware
No Drawing. Continuation-in-part of application Ser. No. 25,527, Apr. 29, 1960. This application Oct. 26, 1962, Ser. No. 233,421
11 Claims. (Cl. 260—47)

This invention is a modified epoxide resin which is less viscous and more reactive on curing, and has improved color and clarity and equal or improved impact resistance, hardness and other physical properties, in comparison to a comparable epoxide resin which has not been so modified.

The new product of the invention is especially useful in coating, laminates, adhesives and castings. It is prepared from (1) an epoxide resin of the type exemplified by the polyether condensation product of epichlorohydrin and a polyhydric phenol, such as Bisphenol A (p-p'isopropylidinediphenol), and (2) a lactone having from 3 to 6 carbon atoms.

Epoxide resins are relatively low molecular weight materials which have terminal epoxy groups and which are capable of being cured to high molecular weight solid resinous materials. A complete description of epoxide resins and their curing agents may be found in Schildnecht's "Polymer Processes, volume X," pp. 429 to 474 (published 1956 by Interscience Publishers, New York).

In making this product, representative and preferred epoxide resins are the commercial resins identified as Epon 828 and Epon 1001 of Shell Chemical Corporation, EP-201 of Union Carbide Corporation. Epon 828 is a reaction product of epichlorohydrin and Bisphenol A which is a viscous liquid at room temperature and has an average epoxide equivalent of one gram equivalent of epoxide per 200 grams of resin. Epon 1001 is a similar reaction product of higher molecular weight, being normally solid and having an epoxide equivalent of one gram equivalent of epoxide per 500 grams of resin. EP-201 is a diepoxide of a saturated alicyclic ester which has the following formula:

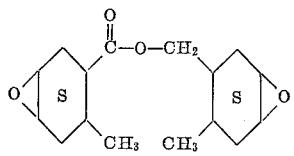

Representative and preferred lactones are beta propiolactone, beta butyrolactone, gamma butyrolactone and epsilon coprolactone (the lactone of epsilon hydroxy caproic acid).

The product may also include plasticizers, fillers, pigments, dyes or other additives or modifiers.

Frequently, monofunctional compounds, such as phenyl glycidyl ether, are added to an epoxide resin to reduce its viscosity. These, however, detract from the final properties of the polymerized material, particularly with respect to heat distortion. The lactones of this invention can serve to eliminate the necessity for such a modifier, as the addition of the lactone will markedly reduce the viscosity of the epoxide resin. The diluent action of the lactone is desirable in systems comprising highly viscous or solid epoxide resins.

In addition, the modification of the epoxide resin with the lactone permits the resin system to cure more easily and makes possible the cure of resins with catalysts which are ineffective to cure unmodified epoxide resins under comparable conditions.

The preferred class of resins useful in preparing a product in accordance with our invention includes those resins which consist of monomeric or polymeric polymerizable organic epoxy compounds which have an epoxy equivalency of at least one gram equivalent of epoxide per 100 grams of resin and preferably those in which any functional groups other than epoxy or hydroxy groups are absent or do not interfere with the reactions during curing.

The procedure for curing the lactone modified epoxide resin follows conventional lines known to those skilled in the art particularly for the preparation of epoxide resin for casting and potting compounds.

The amount of lactone to be used depends, in general, upon the epoxy equivalent of the resin and ordinarily ranges from ½ mole to 1½ moles of lactone per epoxy equivalent of resin. The temperature to be used in curing the product depends upon the particular application and particularly the catalyst systems but, in general, an elevated temperature is desirable to hasten the curing reaction.

Curing temperatures from about 120° C. to 180° C. and curing periods from 12 to 20 hours are suitable. To improve the properties of the resin it is generally desirable to subject it to a post-cure of two to four hours at a temperature from 30 to 60° C. higher than the curing temperature.

The epoxide resin-lactone mixtures are stable on storage for an indefinite period at ordinary temperatures in the absence of a curing catalyst. They are stable for one to two weeks at ordinary temperatures after being blended with a catalyst and stable to temperatures up to about 150° C. in the absence of a catalyst.

Any of the catalysts known to be useful in the curing of epoxide resins may be used to cure the epoxide-lactone mixtures of this invention. The curing catalysts discussed in the Schildnecht reference cited above may be used, including amines, amine salts and anhydrides of dibasic acids. The preferred catalysts include benzyl methyl amine, boron trifluoride-monoethyl amine complex and boron trifluoride-piperidine complexes.

Where Epon 828 of Shell Chemical Corporation was modified with beta propiolactone we found it preferable to use 1 mole of the lactone per epoxy equivalent of the resin and to use about 1% benzyl dimethyl amine or BF₃ monoethylamine complex as a catalyst.

Example I 100 parts of Epon 828 of Shell Chemical Corporation, 18 parts of beta propiolactone (about ½ mole per epoxy equivalent of the resin) and 1 part of benzyl dimethyl amine in the order specified were charged to a vessel and stirred at moderate speed for 15 minutes. The mixture was a clear viscous resinous mass. Castings were made between two glass panels (8" x 10") separated by a ¼" thick gasket of silicone rubber. The castings were cured for 16 hours at 120° C. and for 2 hours at 180° C.

Example II

A mixture of 100 parts of Epon 828, 18 parts of beta propiolactone and 1 part of boron trifluoride-monoethyl amine was prepared, cast and cured as in Example I.

Example III

A mixture of 100 parts of Epon 828, 36 parts of beta propiolactone and 0.5 part of boron trifluoride-monoethyl amine was prepared, cast and cured as in Example I.

Example IV

A mixture of 100 parts of Epon 828, 28.5 parts of epsilon caprolactone (about ½ mole per epoxy equivalent of resin) and 1 part of boron trifluoride-monoethyl amine was prepared, cast and cured as in Example I.

Example V

A mixture of 100 parts by weight of Epon 828 and 1 part of benzyl dimethyl amine was prepared, cast and cured as in Example I.

Example VI

A mixture of 100 parts of Epon 828, 80 parts of endo-cis-bicyclo (2,2,1) (methyl) 5 heptene-2,3 dicarboxylic anhydride and 1 part benzyl dimethyl amine was prepared, cast and cured as in Example I.

Example VII

A mixture of 100 parts of Epon 828, 80 parts of endo-cis-bicyclo (2,21) (methyl) .5 heptene-2,3 dicarboxylic anhydride and 1 part of boron trifluoride-monoethyl amine was prepared, cast and cured as in Example I.

The cured products of the foregoing examples had the respective physical properties set forth in Table I below. The tests were made as follows: Rockwell Hardness, in accordance with ASTM Procedure D–785–51; heat distortion point, under stress of 264 p.s.i. in accordance with ASTM Procedure D–648–56T; Izod impact resistance, ft. lbs./in. notch, 2 lb. hammer, in accordance with ASTM Procedure D–256–56T.

It has been found that under certain conditions combinations of an epoxy resin and a lactone can be cured at room temperatures, e.g. 16 to 44° C., particularly 20 to 30° C., through the use of a boron trifluoride-acetic acid or a boron trifluoride-etherate complex.

In this embodiment of the invention, it is preferred to utilize about 0.2 to 0.8 equivalent of lactone per epoxy equivalent and to employ about 0.24 to about 1.0 gram of catalyst per 100 grams of epoxy resin. It is within the scope of this embodiment of this invention to use one or more lactones simultaneously in combination with an epoxy resin to form a room temperature curable composition. When a combination of lactones is used, the lactone equivalent is comparable to that set forth above. Compositions made according to this embodiment of this invention have been found to be curable at room temperature to form hard solid castings in from about ½ to 62 hours.

Example XII

A composition was made containing 25 parts by weight of an epoxy resin (the reaction product of epichlorohydrin and 2,2 bis(p-phenol)propane) having an epoxy equivalent of 0.48 per hundred gram of resin; 7.1 parts by weight of ε-caprolactone and 0.25 part by weight of boron trifluoride di-n-butyl etherate. This composition cured

TABLE I

| Properties | Examples | | | | | | |
|---|---|---|---|---|---|---|---|
| | 1 | 2 | 3 | 4 | 5 | 6 | 7 |
| Rockwell Hardness | 105-L | 113-L | 110-L | 105-L | 106-L | 109-M | 113-M |
| Heat Distortion Pt., ° C | 58 | 63 | 55 | 62 | 71 | 60 | 66 |
| Izod Impact Resistance | 1.15 | 0.61 | 0.74 | 0.74 | 1.04 | 0.49 | 0.40 |
| Stress, p.s.i. at 5% strain | 19,140 | 17,200 | 16,550 | 18,640 | 19,900 | (1) | (1) |
| Modulus of elasticity ×10⁶ p.s.i | 0.560 | 0.5 | 0.46 | 0.5 | 0.54 | 0.525 | 0.55 |
| Color | Pale | Pale | Pale | Pale | (2) | Dark | (3) |

[1] Too brittle.
[2] Moderately discolored.
[3] Very dark.

Comparing the lactone modified product of Example I with the equivalent but unmodified product of Example V it may be seen from Table I that the former had superior impact resistance and color and its other properties were comparable to those of the latter.

From Table I it may also be noted that the lactone products of Examples I–IV had better impact resistance and color than the anhydride modified products of Examples VI and VII.

Example VIII

A mixture of 100 parts of Epon 828 and 2 parts of boron trifluoride-piperidine was prepared, cast and heated as in Example I. No curing took place.

Example IX

A mixture of 100 parts of Epon 828, 18 parts of beta propiolactone and 2 parts of boron trifluoride-piperidine was prepared, cast and heated as in Example I. In contrast to Example VIII, curing took place to produce a resin having a Rockwell Hardness of 108–L and a heat distortion temperature of 52° C. (both measured as described above).

Example X

A mixture of 100 parts of Epon 828 and 1 part of boron trifluoride-monoethyl amine was prepared, cast and heated as in Example I. Curing did not take place. This is in contrast to Example II wherein beta propiolactone was included in the mixture and Example IV wherein epsilon caprolactone was included in the mixture.

Example XI

A mixture of 100 parts of Epon 828 and 0.5 parts of boron trifluoride-monoethyl amine was prepared, cast and heated as in Example I. Curing did not take place. This is in contrast to Example III wherein the same mixture with beta propiolactone was successfully cured.

at room temperature in about 30 minutes to form a solid product.

Example XIII

A composition was made containing 25 parts by weight of an epoxy resin (the reaction product of epichlorohydrin and 2,2 bis(p-phenol)propane) having an epoxy equivalent of 0.48 per hundred gram of resin; 2.3 parts by weight β propiolactone; 3.56 parts of ε-caprolactone and 0.07 part of boron trifluoride di-acetic acid. This composition cured at room temperature in about 22 hours.

Example XIV

A composition was made containing 25 parts by weight of an epoxy resin (the reaction product of epichlorohydrin and 2,2 bis(p-phenol)propane) having an epoxy equivalent of 0.48 per hundred gram of resin; 2.3 parts by weight β propiolactone; 3.56 parts of ε-caprolactone and 0.25 part of boron trifluoride of di-n-butyl etherate. This composition cured at room temperature in about 15 minutes.

This application is a continuation-in-part of our U.S. application Ser. No. 25,527 filed Apr. 29, 1960.

It is to be understood that the foregoing detailed description is given merely by way of illustration and that many variations may be made therein without departing from the spirit of our invention.

Having described our invention what we desire to secure by Letters Patent is:

1. A room temperature-curable epoxy resinous composition comprising:
   (A) an epoxide resin containing terminal unreacted epoxy groups,
   (B) from about 0.2 to 0.8 equivalent, per epoxy equivalent of said (A), of at least one monolactone having from 3 to 6 carbon atoms in the lactone ring, and (C) a catalytic amount of a catalyst selected from the group consisting of a boron trifluoride-etherate complex and a boron trifluoride-acetic acid complex.

2. A composition as described in claim 1 wherein said epoxide resin is a polyether condensation product of an epihalohydrin and a polyhydric phenol.

3. A composition as described in claim 1 wherein said epoxide resin is a polyether condensation product of epichlorohydrin and p,p'-isopropylidenediphenol.

4. A composition as described in claim 1 wherein said monolactone is selected from at least one member of the group consisting of β-propiolactone, β-butyrolactone, γ-butyrolactone and ε-caprolactone.

5. A composition as described in claim 1 wherein said lactone is β-propiolactone.

6. A composition as described in claim 1 wherein said lactone is a mixture of β-propiolactone and ε-caprolactone.

7. A composition as described in claim 1 wherein said epoxide resin is a polyether condensation product of epichlorohydrin and p,p'-isopropylidenediphenol and said monolactone is β-propiolactone.

8. A composition as described in claim 1 wherein said epoxide resin is a polyether condensation product of epichlorohydrin and p,p'-isopropylidenediphenol and said monolactone is a mixture of β-propiolactone and ε-caprolactone.

9. A composition as described in claim 8 wherein said catalyst is boron trifluoride di-acetic acid.

10. A composition as described in claim 8 wherein said catalyst is boron trifluoride di-n-butyl etherate.

11. A curable composition consisting essentially of
(1) a 1,2-epoxy compound having a 1,2-epoxy equivalency greater than 1;
(2) a curing agent for said 1,2-epoxy compound; and
(3) ε-caprolactone.

References Cited
UNITED STATES PATENTS

| | | | |
|---|---|---|---|
| 3,294,743 | 12/1966 | Mack | 260—47 |
| 2,888,403 | 5/1959 | DeGroote et al. | 260—53 |
| 2,893,973 | 7/1959 | Heckler et al. | 260—47 |
| 2,455,731 | 12/1948 | Caldwell | 260—78.3 |
| 3,203,920 | 8/1965 | Nikles et al. | 260—47 |
| 3,222,312 | 12/1965 | Wyart et al. | 260—830 |

WILLIAM H. SHORT, *Primary Examiner.*

T. D. KERWIN, *Assistant Examiner.*